UNITED STATES PATENT OFFICE.

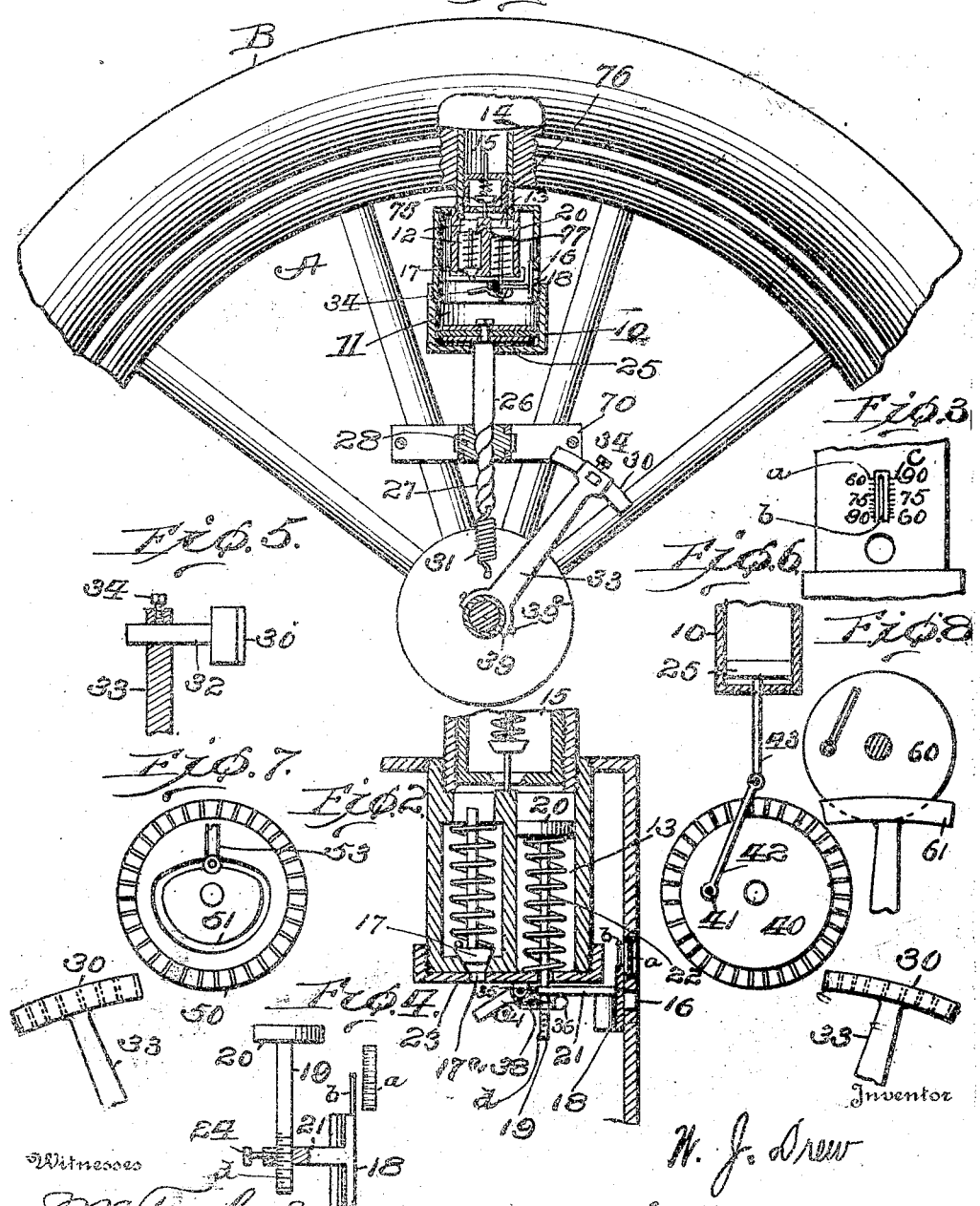

WILLIAM J. DREW, OF RACINE, WISCONSIN.

MEANS FOR INFLATING PNEUMATIC TIRES.

1,134,186.                    Specification of Letters Patent.         Patented Apr. 6, 1915.

Application filed April 2, 1914. Serial No. 329,112.

*To all whom it may concern:*

Be it known that I, WILLIAM J. DREW, a citizen of the United States, residing at Racine, in the county of Racine and State of Wisconsin, have invented new and useful Improvements in Means for Inflating Pneumatic Tires, of which the following is a specification.

This invention relates to means for inflating pneumatic tires and consists in the novel correlations and combinations of elements substantially as hereinafter described and particularly pointed out in the subjoined claims.

One of the important purposes of the present invention is to provide a simple and practicable means whereby a pneumatic tire may be inflated by a pump which is operated by power derived from the rotation of the wheel to which the tire is applied.

Another of the important purposes of the invention is to provide a combined tire inflating means and air-pressure gage, that is to say, to provide a tire inflating means with a means which will disclose the pressure of the air within the tire.

A further important purpose of the present invention is to provide a tire inflating means of the type which comprises a pump operated by power derived from the rotation of the wheel to which the tire is applied and which means comprises a valvular mechanism automatically operable to prevent overinflation of the tire without necessitating the stoppage of the pump when the desired pressure in the tire has been attained. This being accomplished according to the present invention by opening a vent to the atmosphere when the predetermined pressure in the tire has been attained, and, preferably, by diverting the course of the pumped air so that it flows through said vent without first going into the tire.

A further important purpose of the present invention is to provide a tire inflating means having provision for the supply of air to the tire or its flow to the atmosphere, under control of a predetermined pressure in the tire, and which includes means whereby the pressure at which the air shall flow to the atmosphere may be adjustably regulated.

A still further important purpose of the present invention is to provide a pump which is operable to inflate a pneumatic tire automatically from the rotative movement of the wheel to which the tire is applied and which comprises driving members one of which is manually adjustable into and out of operative relation with the other to thereby start or stop the pump.

These purposes and others which will hereinafter appear are well carried out by the constructions illustrated in the accompanying drawings, wherein:

Figure 1 is a view partly in elevation and partly in section showing part of an automobile wheel provided with a combined tire-inflating means and gage constructed in accordance with the present invention. Fig. 2 is a longitudinal section of the valved portion of the pump, drawn to a larger scale than Fig. 1. Fig. 3 is a detail elevation particularly intended to show the indicator. Fig. 4 is a detail view more particularly showing the means for connecting the valve to its operating element, and the indicator correlated with the valve. Fig. 5 is a detail view showing the adjustable connection of the rack with its support. Figs. 6, 7 and 8 are detail views showing different means for operating the pump piston from the rotative movements of the wheel.

Similar characters of reference denote corresponding parts in the several views.

The wheel A and pneumatic tire B may be of the usual or any suitable construction.

10 designates a pump cylinder which is suitably carried from the wheel and comprises a main piston chamber 11 and chambers 12 and 13. The chambers 12 and 13 have communication with the inner tube 14 of the pneumatic tire and also with the main piston chamber 11. Their communication with the inner tube may be effected in any suitable way, as for example, by screwing the pump to a nipple 15 projecting from the inner tube 14. The piston chamber 11 has a vent opening 16 through which it may be thrown into communication with the atmosphere.

The chamber 12 serves for the inlet of air to the inner tube 14 and has a suitable spring-pressed valve 17 which is arranged to be opened by the pressure of the air in the piston chamber 11 when the pump is operating with the vent opening 16 closed. The vent opening 16 is opened and closed by a valve 18 which is operatively connected to the stem 19 of a piston 20 which operates in the chamber 13. The preferred connection between the valve 18 and stem 19 comprises a lateral arm 21 which projects from the valve and is secured to the stem. In the operation of the device, the piston head 20 is subjected to the pressure of the air in the inner tube, this pressure tending to move the valve 18 in the direction which uncovers the opening 16. A spring 22 is preferably employed to counteract this tendency and hold the valve 18 in the position in which it covers the opening 16 until the air in the inner tube has attained a predetermined pressure. This spring is preferably mounted between the piston 20 and a cap 23.

It is preferred in practice to cause the valve 18 to uncover the opening 16 at different predetermined pressures in the inner tube and in the accompanying drawings I have illustrated the preferred way of accomplishing this, the way herein exemplified taking advantage of the fact that the length of movement of the piston and its stem will be in accord with the air-pressure exerted thereon in excess of the opposing pressure exerted by the spring. Thus, it will be noted that the arm 21 is adjustably secured to the stem 19, by suitable means, as the set screw 24, for example, whereby it may be arranged to travel a shorter distance in order to uncover the opening 16 at a lower pressure than is required for a higher pressure. An alternative adjustment permitted by the means illustrated is to move the piston stem 19 downward through the arm so as to increase the tension of the spring when it is desired to have the vent opened at a higher pressure than that for which the valve was previously set.

The main piston of the pump is marked 25. This piston is operated from the rotative movement of the wheel A through the intervention of suitable driving connections or gearing which includes a fixed member along which the pump is moved in the rotative movements of the wheel. Various driving connections or gearing may be employed without departing from the spirit of my invention, and in Figs. 1, 6, 7 and 8 I have shown different examples thereof.

In the form shown in Fig. 1, the stem 26 of the piston has a worm 27 which extends through a bore in a gear arranged to move the worm longitudinally. The gear 28 is mounted to have rotative movement but is held against movement longitudinally of the piston stem. Its toothed external surface is engaged by a rack 30 which is fixed against movement and is arranged in the path traversed by the gear 28 in the rotation of the wheel A. Accordingly, it will be seen that once in each revolution of the wheel A the gear 28 will be brought into operative relation with the rack 30 and will be rotated by said rack, its rotative movement imparting longitudinal movement to the piston stem and causing the piston 25 to move in the piston chamber 11. Reverse movement of the piston and its stem is caused by a retractile spring 31 which is suitably connected to the stem.

The rack 30 is preferably provided with a projecting arm 32 which is adjustably mounted in a support 33 having suitable means, as a set screw 34 for example, for securing the arm 32 in adjusted position, whereby the rack may be adjusted out of the path traversed by the gear 28 when it is desired that the pump shall not operate while the wheel is rotating; but it is apparent that no harm will be done if the pump be operated continuously during the running of the vehicle, because of the automatic opening of the vent 16 when a predetermined pressure in the tire has been attained. In the herein exemplified form of the invention, the supply of air to the tire is cut off and the pumped air escapes directly to the atmosphere from the chamber 11 when the opening 16 is uncovered, and this is preferred, although it may not be wholly essential to prevent air from entering the tire when the vent 16 is opened. I may, if desired, provide an auxiliary valve 34 for closing the air inlet opening 17ª when the predetermined pressure in the tire has been reached and the vent 16 is open. This valve, as most clearly shown in Fig. 2, is pivoted at 35 and has an arm 36 which projects into the path of the arm 21, whereby the valve 34 will be moved to cover the opening 17ª while the valve 18 is uncovering the opening 16 and will be held in its closing position until the valve 18 has covered the opening 16. A spring 38 for returning the valve to its open position is preferably employed.

The support 33 preferably has a bifurcated lower end 39 having suitable devices, as the set screws 39ª, for example, for securing it to a suitable fixed part of the vehicle.

As already stated, I have exemplified in the accompanying drawings different forms of driving connections to the piston from the one illustrated in Fig. 1. Thus, in Fig. 6, the driving connection includes a crown gear 40 having an eccentrically set pin 41 connected by a pitman 42 to the end of the piston-shaft, marked 43 in this figure. In Fig. 7 I have exemplified a construction which utilizes a cam groove 51, said groove being formed in a crown gear, marked 50, operatively connected to one end of the piston stem, marked 53. In each of these forms, the rack 30 may be employed to drive the crown gear. The correlation of the rack and crown gear is preferably such that the gear is rotated once for each two revolutions of the wheel. In the form shown in Fig. 8, friction members are substituted for the gears and racks of the before-mentioned figures: 60 designating the friction gear which takes the place of the gears 28, 40 and 50, and 61 designating an arcuate actuating member which takes the place of the toothed rack 30. The contacting surfaces of the gear 60 and member 61 are free from teeth, as shown. Any suitable means for transmitting movement from the gear 60 to the piston may be employed.

From the foregoing, the operation of the tire-inflating means will readily be understood to be as follows: The rotation of the wheel A causes, in the manner hereinbefore described, the piston 25 to be reciprocated. When the pressure of the air is below that desired in the tire, the piston 20 is held in the position in which the valve 18 closes the opening 16 and the valve 17 is raised, permitting the air to enter the tire and to be retained therein. When the predetermined pressure in the tire has been attained, said pressure, acting upon the piston head 20, overcomes the power of the spring 22 and through the stem 19 and arm 21 moves the valve 18 slidably and uncovers the opening 16. The pressure predetermined for the tire, when attained, also closes the valve 17. Accordingly, the continued operation of the pump will merely act to throw the main piston chamber 11 thereof into communication with the atmosphere, no further air entering the tire except such air as is required to replace that which is lost through leakage. It will be noted that the loss of air through leakage due to a punctured inner tube, may be compensated for and deflation of the tire thereby prevented, by keeping the pump constantly in operation until a sound inner tube has been substituted for the punctured one. It will also be noted, as already stated, that the opening of the piston-chamber 11 to the atmosphere may be accomplished at different predetermined pressures by adjusting the arm 21 and piston stem 19 relatively to each other.

In order that the pressure of the air in the tire may be indicated from the different positions of the valve 18, or the piston stem, I have provided a scale $a$ and a pointer $b$, which are relatively movable, the movable part being arranged to be adjusted with the arm 21 and valve 18. In the herein-exemplified form of the invention, the pointer is movable and the scale is fixed. The scale $a$ preferably consists of a suitable series of indicating characters mounted on or formed in a transparent base, as the sheet of glass shown best in Fig. 3, for example.

Means should be provided to indicate the position to which the valve 18 should be set to open the vent when a particular pressure in the tire is attained. One suitable means for this purpose is afforded by a scale $c$ arranged to coöperate with the pointer $b$, the scale $c$ and pointer $b$ being so correlated that when the valve 18 has been adjusted on the stem 19 to open the vent 16 at a particular pressure, the pointer $b$ will stand opposite the corresponding mark on the scale $c$. If preferred, however, the stem 19 may be provided with characters, as shown at $d$, to indicate the positions to which the arm 21 should be adjusted therefor to cause the vent to be opened at predetermined pressures.

While it is preferred in practice to equip each wheel with a tire inflating pump, yet it would not be a departure from my invention to provide one pump only for any number of tires, the said pump in such case being arranged to be readily detachable from and applicable to the wheels. Thus, upon reference to Fig. 1, it will be noted that the pump body may be readily unscrewed from the nipple through which it has communication with the inner tube, and that the brackets 70 by which the pump is secured to the wheel spokes are detachably secured to the latter and that the support 33 together with the rack carried thereby may be readily removed or applied.

It will be understood that suitable provision will be made for preventing escape of the air from the tire when the inflating means is detached therefrom. One suitable means for the purpose is shown in the accompanying drawings, wherein a check valve 75 is shown as being mounted in the nipple 15. This valve is arranged to be held to its seat 76 so as to prevent escape of air from the tire when the pump is detached from the nipple and is held away from its said seat by a projection 77 which is carried by the pump.

Having now described the invention what I believe to be new and desire to secure by Letters Patent, and what I, therefore, claim, is:—

1. Means for inflating a pneumatic tire, embracing a pump arranged to be connected to the wheel provided with said tire, said pump comprising a main chamber, an air inlet chamber between the main chamber and the tire, said air inlet chamber having a check valve, a piston chamber, a piston in the latter chamber arranged to be exposed to the pressure of the air in the tire and having means to oppose the movement of the piston in one direction, an air vent from the main chamber, a valve arranged to cover and uncover said vent, connections between the latter valve and the piston, a pumping piston in the main chamber and means for operating the pumping piston from the rotative movements of the wheel.

2. Means for inflating a pneumatic tire, embracing a pump arranged to be connected to the wheel provided with said tire and having a vent opening, the pump also having a chamber between the vent opening and tire, a piston in the chamber, said piston being arranged to be exposed to the pressure in the tire, a valve arranged to cover and uncover the vent opening, means for adjustably securing the valve to the stem of the piston, a main chamber, a pumping piston in said chamber, means for operating the latter piston from the rotative movements of the wheel, and a valved air inlet chamber arranged to connect the main chamber with the tire.

3. Means for inflating a pneumatic tire, embracing a pump arranged to be connected to the wheel provided with said tire and having a vent opening, the pump also having a chamber between the vent opening and tire, a piston in the chamber, said piston being arranged to be operated under control of pressure in the tire, a main chamber, a pumping piston in the main chamber, means for operating the latter piston from the rotative movements of the wheel, an air inlet chamber arranged to connect the main chamber with the tire, valves respectively arranged to open the vent and close communication between the main chamber and the air inlet chamber when a predetermined pressure in the tire has been attained, and operative connections between the latter valves and the first-mentioned piston.

4. Means for inflating a pneumatic tire, embracing a pump arranged to be connected to the wheel provided with said tire and having a vent opening, the pump also having a chamber between the vent opening and tire, a piston in the chamber, said piston being arranged to be operated under control of pressure in the tire, a main chamber, a pumping piston in the main chamber, means for operating the latter piston from the rotative movements of the wheel, an air inlet chamber arranged to connect the main chamber with the tire, a spring-pressed valve for closing the latter chamber, a valve arranged to open and close the vent, an auxiliary valve for closing communication between the main chamber and the air inlet chamber when a predetermined pressure in the tire has been attained, and operative connections between the first mentioned piston and the auxiliary valve and vent valve.

5. Means for inflating a pneumatic tire, embracing a pump arranged to be connected to the wheel provided with said tire and having an operating mechanism by which it is operated from the rotative movements of the wheel, the pump also having a vent, a valve for controlling the vent, means for operating the valve under control of pressure in the tire, and an indicator comprising a relatively movable scale and pointer having connection with the valve operating means.

6. Means for inflating a pneumatic tire, embracing a pump arranged to be connected to the wheel provided with said tire and having an operating mechanism by which it is operated from the rotative movements of the wheel, the pump also having a vent, a valve for controlling the vent, a piston and its stem, said piston being arranged to be exposed to the pressure in the tire, means for adjustably securing the valve to the piston, a pointer carried by the latter means and a scale coöperating with the pointer to indicate the pressure in the tire.

7. In an inflating means for a pneumatic tire, a pump having a piston, means for reciprocating the piston, said means including a rotatably mounted gear, connections between the gear and piston and a toothed rack for intermittently operating the gear from the rotative movements of the wheel having a tire to be inflated, the pump and gear being arranged to be carried by the rotative part of the wheel and the rack being fixed and arranged in a part only of the path traversed by the gear in the rotative movements of the wheel.

8. In an inflating means for a pneumatic tire, a pump having a piston, a worm having connection with the piston, a spring connected to the worm, a gear having a bore operatively engaged with the worm, the worm being movable longitudinally in the gear and the gear being arranged to rotate around the worm, means for connecting said parts to a wheel having a tire to be inflated, combined with a means arranged to intermittently operate the gear from the rotative movements of the wheel, said means being arranged to be operatively engaged with the gear in a part only of the path traversed by the gear.

9. Means for inflating a pneumatic tire, embracing a pump having a piston, means for reciprocating the piston, said means including a rotatably mounted gear, connections between the gear and piston and a toothed rack for intermittently operating the gear from the rotative movements of the wheel having the tire to be inflated, the pump and gear being arranged to the carried by the rotative part of the wheel and the toothed rack being arranged in a part of the path traversed by the gear in the rotative movements of the wheel, and a support for the rack, said rack being manually adjustable with reference to its support and having means for fixing it in its adjusted position and serving when in operative position to intermittently operate the gear.

10. A wheel having a pneumatic tire, a pump casing carried by the wheel and having connection with the tire, a piston in said casing and means for reciprocating the piston, including a gear which is carried by the wheel, said gear having a bore through which the stem of the piston extends, said stem being movable longitudinally in the bore and the gear being mounted to rotate around the stem, and means for operating the gear.

In testimony whereof I have hereunto set my hand in presence of two subscribing witnesses.

WILLIAM J. DREW.

Witnesses:
 THOMAS DURANT,
 C. J. STOCKMAN.